United States Patent
Frank et al.

(10) Patent No.: US 6,212,641 B1
(45) Date of Patent: Apr. 3, 2001

(54) METHOD AND APPARATUS FOR IMPROVING POWER CHARACTERISTICS IN A SYSTEM HAVING A REDUCED POWER MODE

(75) Inventors: Andrew Frank, Woodland Hills; Steven A. Klein, Long Beach, both of CA (US)

(73) Assignee: Inside Out Networks, Austin, TX (US)

( * ) Notice: Subject to any disclaimer, the term of this patent is extended or adjusted under 35 U.S.C. 154(b) by 0 days.

(21) Appl. No.: 09/121,648

(22) Filed: Jul. 23, 1998

(51) Int. Cl.$^7$ ................................................. G06F 1/32
(52) U.S. Cl. ................................... 713/323; 713/601
(58) Field of Search ................................ 713/322, 323, 713/324, 501, 601

(56) References Cited

U.S. PATENT DOCUMENTS

| | | | |
|---|---|---|---|
| 5,396,635 | * 3/1995 | Fung | 713/323 |
| 5,628,020 | * 5/1997 | O'Brien | 713/322 |
| 5,822,596 | * 10/1998 | Casal et al. | 713/322 |
| 5,903,601 | * 5/1999 | Elnashar et al. | 713/322 |
| 5,935,253 | * 8/1999 | Conary et al. | 713/322 |
| 5,983,356 | * 11/1999 | Pandey et al. | 713/322 |
| 5,987,617 | * 11/1999 | Hu et al. | 713/322 |

* cited by examiner

*Primary Examiner*—Glenn A. Auve
(74) *Attorney, Agent, or Firm*—Blakely Sokoloff Taylor & Zafman

(57) ABSTRACT

A method and apparatus for improving power consumption characteristics of a system having an active mode and a low power mode. A signal source, such as a system clock, switches when the system is in active mode and does not switch when the system is in low power mode. An activity monitor is coupled to the signal source to detect if the signal source is switching. Based on the detection, the activity monitor drives switching control logic. The switching control logic disconnects nonessential auxiliary circuits from the power supply in response to a detection of a non-switching condition. When switching resumes, the switching control logic is driven by the activity monitor to restore power to the auxiliary circuit fast enough that power up does not delay system operation.

8 Claims, 3 Drawing Sheets

METHOD AND APPARATUS FOR IMPROVING POWER CHARACTERISTICS IN A SYSTEM HAVING A REDUCED POWER MODE

BACKGROUND OF THE INVENTION (1) Field of the Invention

The invention relates to power conservation. More specifically, the invention relates to reduction of power consumption in a low power mode.

(2) Background

Reduced power consumption is generally regarded as a desirable characteristic, but in some power critical applications, reducing power consumption may become essential. Certainly, in mobile devices reduced power consumption will increase battery life and permit longer operation in the mobile environment. Additionally, certain industry specifications require power consumption at a very low level. For example, the Universal Serial Bus (USB) Specification Version 1.0, published Jan. 19, 1996, mandates that bus powered devices draw no more than 100 milliamps after power on, 500 milliamps after enumeration, and no more than 500 microamps when the device is in sleep mode. As USB devices have become increasingly complex, the entire sleep mode power budget has been consumed by the central processing unit (CPU) in the USB device. This leaves insufficient power budget to supply other auxiliary circuitry, including, but not limited to, powering the memory for the processing unit, and any other functionalities.

The power problem is exacerbated by the fact that the CPU in sleep mode must be able to awaken rapidly in response to a wake-up signal. Thus, the CPU cannot be wholly disconnected from the power supply during sleep mode. Prior approaches attempting to permit compliance of USB devices with the sleep mode power budget have generally failed. One attempted solution is to have the CPU turn off the auxiliary circuit responsive to receiving the go-to-sleep signal from the bus. Unfortunately, this creates problems in fetching the sleep instructions, as the memory for the CPU is often included in the auxiliary circuitry. Moreover, a greater problem arises when the wake-up signal arrives and the auxiliary circuitry is not yet powered. As a result, the CPU is unable to fetch the instructions needed to appropriately respond as required. Other attempted solutions have generally failed to permit the devices to meet the 500 microamp sleep budget. This problem has been sufficiently vexing that many manufacturers have been lobbying the USB Standards Committee to increase the power budget for sleep mode of USB compliant devices.

In view of the foregoing, it would be desirable to provide a way to satisfy power budgets in extremely power-constrained systems, while still permitting acceptable response time and transitioning in and out of a low power mode.

BRIEF SUMMARY OF THE INVENTION

A method and apparatus for improving power consumption characteristics of a system having an active mode and a low power mode is disclosed. A signal source, such as a system clock, switches when the system is in active mode and does not switch when the system is in low power mode. An activity monitor is coupled to the signal source to detect if the signal source is switching. Based on the detection, the activity monitor drives switching control logic. The switching control logic disconnects nonessential auxiliary circuits from the power supply in response to a detection of a non-switching condition. When switching resumes, the switching control logic is driven by the activity monitor to restore power to the auxiliary circuit fast enough that power up does not delay system operation.

DETAILED DESCRIPTION OF THE INVENTION

Figure 1:
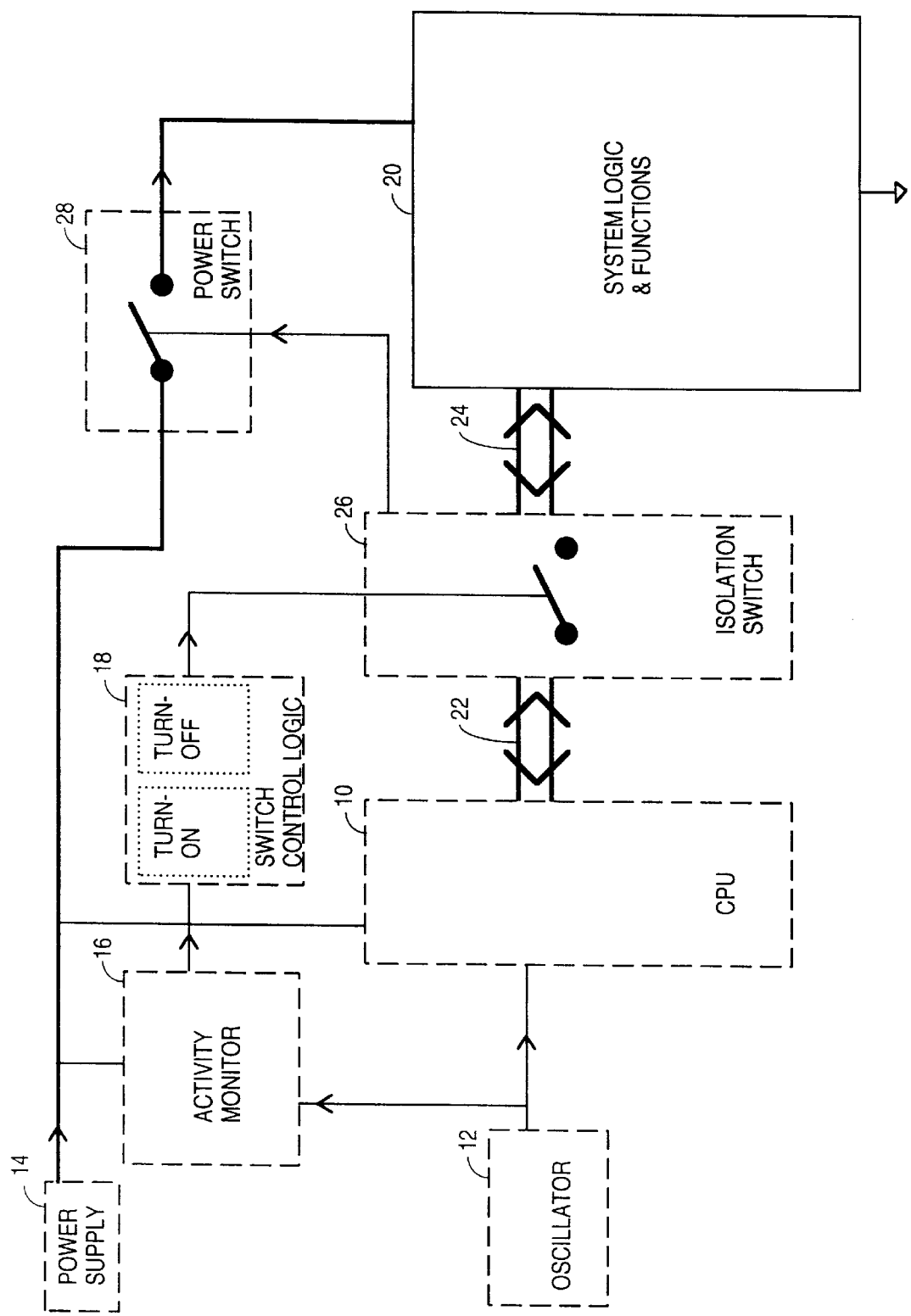
FIG. 1 is a block diagram of one embodiment of the invention.

FIG. 1 is a block diagram of one embodiment of the invention. The central processing unit (CPU) 10 is coupled to an oscillator 12 which provides a docking signal for the CPU. A power supply 14 provides power to the system. Power supply 14 may, for example, be a battery, bus power line, or any other power source. An auxiliary circuit 20 is coupled to CPU 10 via various signal lines 22, 24, through isolation switch 26. A power switch 28 is coupled between power supply 14 and auxiliary circuit 20. Actuation of the power switch 28 cuts power to the auxiliary circuit 20. Isolation switch 26 is provided between the CPU 10 and auxiliary circuit 20 to reduce or eliminate current leakage through the auxiliary circuit. In some systems where leakage current is not a concern or is otherwise compensated for, isolation switch 26 may be eliminated and signal lines may run directly from CPU 10 to auxiliary circuit 20.

An activity monitor 16 is coupled to oscillator 12 to monitor when oscillator 12 is switching and when oscillator 12 is not switching. It is desirable to construct activity monitor 16 such that it has a negligible effect on the operation of oscillator 12. Activity monitor 16 signals switch control logic 18 based on the switching or lack thereof from oscillator 12. If oscillator 12 is switching, then switch control logic 18 ensures that isolation switch 26 and power switch 28 are closed. Conversely, when oscillator 12 is not switching, switch control logic 18 ensures that isolation switch 26 and power switch 28 are open. By opening these switches, no power is supplied to auxiliary circuit 20 and no leakage currents leak through auxiliary circuit 20. Thus, the power drawn by the system is limited to that drawn by the CPU 10 and a negligible amount used in the activity monitor 16.

Figure 2A:
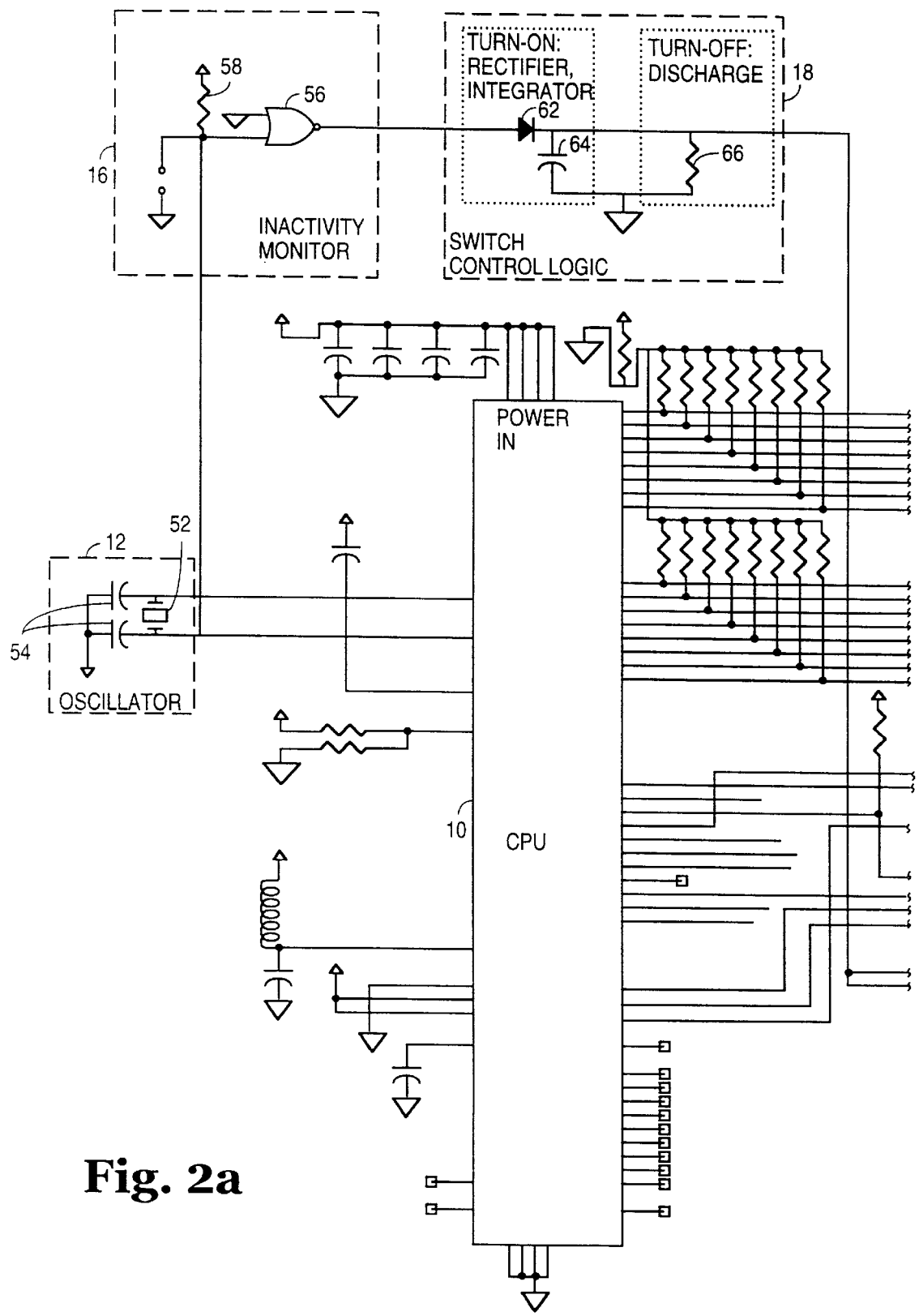
FIGS. 2a and 2b are a schematic diagram of one embodiment of the invention.
Figure 2B:
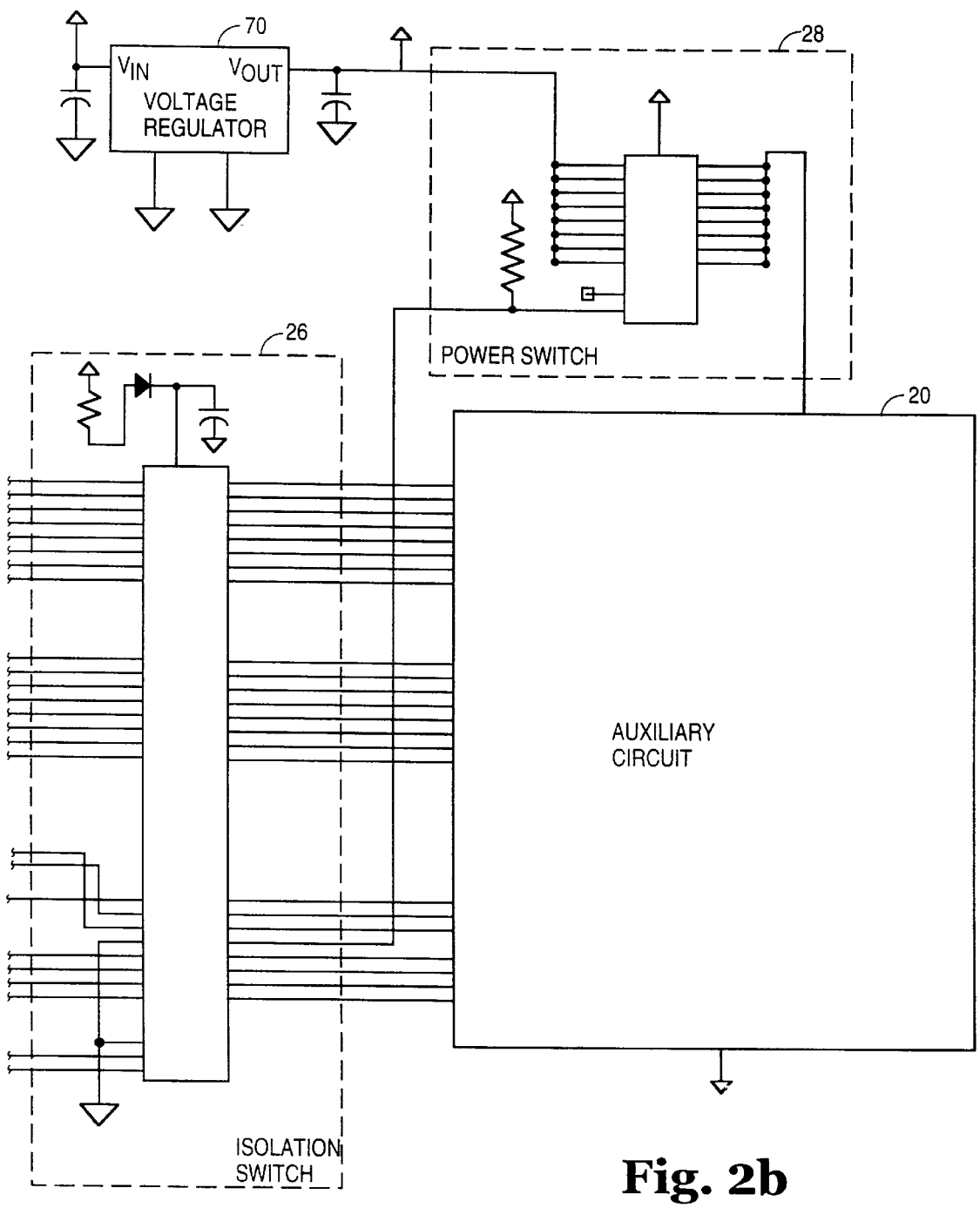

FIGS. 2a and 2b are a schematic diagram of one embodiment of the invention. Oscillator 12 can be synthesized in the usual manner using a crystal 52 and a pair of capacitors 54. If CPU 10 is a USB controller, crystal 52 is likely to have a frequency of 12 megahertz for a full speed device. The CPU 10 may, for example, be a 83930AD microprocessor, available from Intel Corporation of Santa Clara, Calif.

Activity monitor 16 is coupled to one terminal of the oscillator 12. In this embodiment, the activity monitor includes a resistor 58, a high impedance buffer/amplifier 56, and a jumper 60. The high impedance buffer 56 reduces the effect of the activity monitor connection so little or no degradation of the oscillator signal is caused by the connection. One suitable buffer is the 74HC02, available from Texas Instruments Incorporated of Dallas, Tex. (TI). The resistor 58 is coupled between the input terminal of the high impedance buffer 56 and a power supply to ensure that the input is a known state when not being driven by the oscillator 12. The jumper 60 is also supplied to permit the activity monitor 16 to be held in an on state when the CPU 10 is not installed and testing of the remaining circuitry is desired. Jumper 60 could, of course, be eliminated without departing from the scope or contemplation of the invention. Alternative embodiments of the activity monitor employ AC coupling techniques to AC, coupling the oscillator to the switch control logic. Such an embodiment is useful if the switching line carries a DC voltage independent of the switching signal which would otherwise prevent proper functioning of the switch control logic 18.

The switch control logic 18 is instantiated as a rectifier and an RC circuit. The rectifier is instantiated as diode 62. The RC circuit contains capacitor 64 and resistor 66. The time constant of the RC circuit must be sufficiently fast to drive the switches on and permit power to flow to the auxiliary circuitry such that it is powered up and functioning within a settling and stabilization time of CPU 10. This permits the CPU 10 to access the auxiliary circuit as soon as the CPU is fully awake. One embodiment employs a 0.1 $\mu$F capacitor in parallel with a 1 M$\Omega$ resistor. Depending on the signal driven out of switch control logic, the isolation switch and the power switch will be activated and permit signals and power to flow to the auxiliary circuit 20. The isolation switch may be instantiated as a bus switch, such as part number SN74CBT16212DL, available from TI. A power switch may also be instantiated as a bus switch, such as part number SN74CBT3245A, also available from TI. Using bus switches also permits shifting of the voltage reference level used in the auxiliary circuit. A voltage regulator 70 may be used to control the voltage level supplied to auxiliary circuit 20. For example, if USB is supplying approximately five volts, it may be necessary to regulate that voltage to 3.3 volts if auxiliary circuit 20 is a 3.3 volt logic circuit. The auxiliary circuit 20 may be nearly anything. The particulars of the auxiliary circuit form no part of this invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. An apparatus comprising:

a device having an active mode and a low power mode;

a signal source that switches when the device is in active mode and does not switch when the device is in low power mode;

an activity monitor coupled to the signal source to detect when the signal source is switching; and a switch control logic responsive to the activity monitor, the switch control logic to drive a power switch to disconnect power to an auxiliary circuit when the signal source is not switching.

2. The apparatus of claim 1 wherein the signal source is an oscillator.

3. The apparatus of claim 1 wherein the switch control logic comprises:

a rectifier and an RC circuit.

4. The apparatus of claim 3 wherein the device is a processor, and a time constant of the RC circuit is less than a start up and stabilization time of the processor.

5. A system comprising:

a first device having an active mode and a low power mode;

an auxiliary circuit coupled to the first device and receiving a power budget from the first device;

a signal source coupled to the first device to provide a signal that switches when the first device is in the active mode and does not switch when the first device is in the low power mode;

an activity monitor coupled to the signal source to detect switching; and control logic decoupling power to the auxiliary device in an absence of switching.

6. The system of claim 5 further comprising:

a power switch coupled between a power supply and the auxiliary circuit responsive to the control logic.

7. The system of claim 5 further comprising:

an isolation switch coupled between a first device and the auxiliary circuit, the isolation switch responsive to the control logic.

8. A method comprising:

monitoring a signal source that switches when a device is in an active mode and does not switch when the device is in a low power mode;

driving a switch to disconnect power to an auxiliary circuit if the monitoring reflects the low power mode has been entered; and restoring power to the auxiliary circuit faster than the device can transition from the low power mode to the active mode when a transition from the low power mode to the active mode occurs.

* * * * *